United States Patent [19]
Inoue

[11] Patent Number: 5,842,945
[45] Date of Patent: Dec. 1, 1998

[54] TOROIDAL CONTINUOUS VARIABLE TRANSMISSION WITH A LIMITED SLIP DIFFERENTIAL BETWEEN THE OUTPUT TOROID DISKS

[75] Inventor: Eiji Inoue, Sagamihara, Japan

[73] Assignee: Isuzu Motors Limited, Tokyo, Japan

[21] Appl. No.: 925,331

[22] Filed: Sep. 8, 1997

Related U.S. Application Data

[62] Division of Ser. No. 604,075, Feb. 20, 1996.

[30] Foreign Application Priority Data

| Feb. 27, 1995 | [JP] | Japan | 7-61618 |
| Feb. 28, 1995 | [JP] | Japan | 7-63457 |
| Feb. 28, 1995 | [JP] | Japan | 7-63461 |

[51] Int. Cl.$^6$ ............................... F16H 37/02
[52] U.S. Cl. ................ 475/207; 475/211; 475/214; 475/216; 475/217
[58] Field of Search ................ 475/198, 206, 475/207, 211, 214, 216, 217, 231; 476/42; 198/58.41

[56] References Cited

U.S. PATENT DOCUMENTS

| 3,574,289 | 4/1971 | Scheiter et al. ............ 475/214 X |
| 3,866,490 | 2/1975 | Orshansky, Jr. ............ 475/217 X |
| 4,466,312 | 8/1984 | Oguma . |
| 4,913,002 | 4/1990 | Fellows ............ 475/214 X |
| 5,099,710 | 3/1992 | Nakano . |
| 5,136,890 | 8/1992 | Hibi et al. . |
| 5,158,507 | 10/1992 | Guimbretiere ............ 475/231 |
| 5,366,421 | 11/1994 | Hirota ............ 475/231 |
| 5,575,732 | 11/1996 | Inoue . |
| 5,683,324 | 11/1997 | Inoue et al. ............ 475/216 |

FOREIGN PATENT DOCUMENTS

| 0 193 160 | 3/1986 | European Pat. Off. . |
| 61-127965 | 6/1986 | Japan . |
| 6-174034 | 6/1994 | Japan . |

*Primary Examiner*—Khoi Q. Ta
*Attorney, Agent, or Firm*—Browdy and Neimark

[57] ABSTRACT

The toroidal continuous variable transmission has a viscous clutch installed between the output disks to allow their rotation difference even when there is a difference in the transmission ratio between the two toroidal speed change units. If the transmission ratio difference increases, the viscous clutch causes the two units to synchronize with each other, thus preventing the two speed change units from remaining unequal in the transmission ratio. Further, when the transmission ratio difference between the two toroidal speed change units is small, the toroidal continuous variable transmission has a function to self-synchronize the two units. When the transmission ratio difference becomes large, the differential mechanism is activated to prevent seizure due to interlocking or slippage. With this toroidal speed change unit, when an electrical failure occurs, it is possible to fix the transmission ratio to a predetermined value on the low-speed side according to the driver's selection of gearshift position so as to ensure safe driving while running with a heavy load on a descending slope by preventing sudden application of engine braking while traveling at high speed.

7 Claims, 5 Drawing Sheets

TOROIDAL CONTINUOUS VARIABLE TRANSMISSION WITH A LIMITED SLIP DIFFERENTIAL BETWEEN THE OUTPUT TOROID DISKS

This is a division of copending parent application Ser. No. 08/604,075 filed Feb. 20, 1996.

BACKGROUND OF THE INVENTION

1. Field Of The Invention

The present invention relates to a toroidal continuous variable transmission used in automobiles and more particularly to a toroidal continuous variable transmission which has two toroidal speed change units arranged on the same axis, each comprising oppositely arranged input and output disks, power rollers rotating in contact with the input and output disks to transmit the input disk rotation to the output disk while continuously changing the speed of the input disk rotation according to a tilt angle of the power rollers, and trunnions supported on the power rollers.

2. Description Of The Prior Art

The toroidal continuous variable transmission generally has a toroidal speed change unit, which comprises an input disk, an output disk and power rollers disposed between the both disks and which transfers the rotation power of the input disk driven by an input shaft to the output disk through the power rollers, with the rotation power further transmitted from the output disk to an output shaft. For improved transmitting capacity and efficiency, a layout has been developed whereby two toroidal speed change units are mounted on the same axis.

A conventional toroidal continuous variable transmission, as shown in FIG. 6, has two toroidal speed change units 43, 47, which comprise input disks 40, 44, output disks 41, 45 and tiltable power rollers 42, 46 that transmit torque (see Japan Patent Laid-Open No. 174034/1994, for example). This toroidal continuous variable transmission is of a double cavity type in which two toroidal speed change units 43, 47 are mounted opposite each other on the input shaft 48.

The input disk 40 is supported on the input shaft 48 so that it is rotatable reactive to the input shaft. It can also be securely coupled to the input shaft 48 by a loading cam 49 so that it rotates together with the input shaft 48. The other input disk 44 is secured to the input shaft 48 so that it rotates together with the input shaft 48. The input shaft 48 is supported axially movable slightly with respect to a casing not shown. The output disks 41, 45 are disposed opposite the input disks 40, 44 and supported rotatable relative to the input shaft 48. The output disks 41, 45 are connected to each other through a hollow shaft 50. The hollow shaft 50 has secured thereto an output gear 51, which is in mesh with a gear 53 of an output shaft 52.

The power rollers 42 are disposed between the input disk 40 and the output disk 41 and have frictional engagement with the toroidal surfaces of the both disks 40, 41. The power rollers 46 are disposed between the input disk 44 and the output disk 45 and are in frictional engagement with the toroidal surfaces of the both disks 44, 45. The power rollers 42, 46 are rotatable about their own rotation axes 54, 55 and tiltable about tilt axes 56, 57 perpendicular to the rotation axes 54, 55.

The toroidal continuous variable transmission has a link mechanism to cause the power rollers 42, 46 to tilt in synchronism with each other so that their tilt angles are equal. As the tilt angle of the power rollers 42, 46 changes, the frictional contact points between the power rollers 42, 46 and the input disks 40, 44 and output disks 41, 45 change, thus effecting continuous speed change. The rotation power transmitted from the input disks 40, 44 to the output disks 41, 45 through the power rollers 42, 46 is transmitted by the shearing force of oil under high pressure, i.e., traction force (viscous frictional force). To obtain a desired traction force requires a very large pressing force at the contact point between the power rollers 42, 46 and the both disks. This pressing force is produced by pressing the input disk 40 against the output disk 41 by the loading cam 49.

Another example of conventional toroidal continuous variable transmission is shown in FIG. 7 (see Japan Patent Laid-Open No. 174034/1994, for example). This toroidal continuous variable transmission is of a double cavity type, in which two toroidal speed change units 66, 67 are mounted opposite each other on the same axis and comprise input disks 62, 64, output disks 63, 65 and power rollers 68, 69 that tilt about tilt axes 71 perpendicular to rotation axes 70 and couple the input and output disks. The construction of the toroidal speed change units 66, 67 is the same as that of the toroidal speed change units 43, 47. The conventional speed change units of FIG. 6 have the output disks 41, 45 directly coupled together, whereas the second conventional example of FIG. 7 couples the output disks 63, 65 through a differential mechanism 82. The differential mechanism 82 comprises: side gears 73, 75 connected to the output disks 63, 65 through hollow shafts 72, 74; pinions 76 meshed with the side gears 73, 75; a differential case 78 having pinion shafts 77 rotatably supporting the pinions 76; and an output gear 79 secured to the differential case 78 and meshed with a gear 81 of an output shaft 80.

In the toroidal continuous variable transmission of FIG. 7, when the output disks 63, 65 are rotating at the same revolution speed, the side gear 73 connected to one of the output disks 63 and the side gear 75 connected to the other output disk 65 rotate at the same speed. Hence, the pinions 76 in mesh with the side gears 73, 75 do not rotate on their own pinion shafts 77 but revolve around the input shaft 61. When the transmission ratios of the toroidal speed change units 66, 67 differ, however, the revolution speeds of the output disks 63, 65 differ, so that one of the side gears rotates at higher speed than the other. As a result, the pinions 76 in mesh with both of the side gears 73, 75 spin on their own axes while revolve around the input shaft 61.

In the conventional transmission of FIG. 6, the transmission ratios of the two toroidal speed change units 43, 47 may not always be equal due to differences in the units' response at the time of speed change operation. When the disagreement in the transmission ratio is within a very small range, the toroidal speed change unit with a greater transmission ratio performs the speed change operation to reduce the transmission ratio and the other unit with a smaller transmission ratio performs to increase the transmission ratio so that the two units synchronize with each other.

However, as the difference in the transmission ratio becomes large, the conventional transmission of FIG. 6 is interlocked before self-synchronization is achieved, leading to a very dangerous situation. For example, consider a case where the transmission ratio of one toroidal speed change unit is higher than, or on the speed-increase side of, that of the other toroidal speed change unit. Because the pair of input disks are coupled together in the rotation direction on the input shaft, they rotate at the same speed and one of the output disks in the unit with a higher transmission ratio tends to rotate at a higher speed than the other output disk. However, because the pair of output disks are also coupled together on the output shaft, they are only allowed to rotate at the same revolution speed. That is, both the input shaft and the output shaft are locked and cannot perform an intended rotating action. This is analogous to a situation where 2-speed gear and 3-speed gear in the manual transmission engage at the same time. In this way, as the transmission ratio difference increases, both the input shaft and the output shaft of the transmission cannot rotate before self-synchronization is achieved, resulting in a transmission lockup. If the transmission does not lock, the contact portion between the power rollers and the both disks in the toroidal speed change unit, i.e., the traction contact portion, slips and may get seized by the heat produced.

On the contrary, in the second conventional transmission shown in FIG. 7, because the pair of output disks are coupled through the differential mechanism 82, if there is any discrepancy in the transmission ratio between the two toroidal speed change units, the revolution difference between the pair of output disks is absorbed by the differential mechanism 82 in the form of pinion rotation on its own axis. Hence, when a difference occurs between the transmission ratios of the two toroidal speed change units, it is possible to prevent a slip at the traction contact portion.

It should be noted, however, that the transmission ratio difference between the two toroidal speed change units, if occurred, is normally very small and that in a region of a very small transmission ratio difference, the slip at the traction contact portion poses no problem. In spite of this fact, with the above conventional transmission, the differential function is activated at all times regardless of the magnitude of the transmission ratio difference, inactivating the self-synchronization function. Hence, the overall transmission efficiency of the toroidal continuous variable transmission decreases to that extent.

A toroidal continuous variable transmission disclosed in Japan Patent Laid-Open No. 174034/1994 has an input shaft, a pair of input disks that rotate with the input shaft, a pair of output disks disposed opposite the corresponding input disks and supported on the input shaft so that they are rotatable relative to the input shaft, tiltable power rollers disposed between the opposing input disks to the output disks, a differential mechanism that couples the output disks, and an output shaft connected to the differential mechanism. The differential mechanism may be a bevel gear type differential mechanism or a planetary gear type differential mechanism. In this toroidal continuous variable transmission, because the two output disks are coupled through the differential mechanism, if a discrepancy occurs between the transmission ratios of the two toroidal speed change units, the difference in the revolution speed of the two output disks is absorbed by the differential mechanism. Hence, no slip occurs at the traction contact portions in the toroidal speed change units. But the self-synchronization function fails to work, giving rise to a possibility of the transmission ratios of the two units remaining unequal.

A further conventional toroidal continuous variable transmission is disclosed in Japan Patent Laid-Open No. 127965/1986. To hydraulically operate one of moving members of a control valve to simplify the control, this toroidal continuous variable transmission uses an actuator, which comprises a hydraulically driven piston, a spring installed in a chamber on one side of the piston-to urge the piston toward the other side, and a solenoid valve to control oil pressure supplied to a chamber on the other side of the piston according to a signal from the speed change controller.

FIG. 8 shows a conventional hydraulic apparatus for the toroidal speed change units of the toroidal continuous variable transmission mounted on automobiles. This transmission includes an input shaft 211 that receives an engine output, an input disk 212 rotatably supported on the input shaft 211, an output disk 213 disposed opposite the input disk 212 and rotatably supported on an output shaft 208, tiltable power rollers 203 disposed between the input disk 212 and the output disk 213 to transfer torques from the input disk 212 to the output disk 213, and trunnions 204 that support the power rollers 203. The power rollers 103 are tilted to change the rotation speed of the input disk 212 continuously when transmitting the torques from the input disk 212 to the output disk 213. The toroidal continuous variable transmission with the above construction tilts the power rollers 203 by an actuator 205 that is operated according to signals from a controller 207.

The power rollers 203 in the speed change unit are disposed opposite each other between the opposing input disk 212 and output disk 213 and are rotatably supported on the trunnions 204, the supporting members, through eccentric shafts. The trunnions 204 are supported povitable and axially movable on a casing of the transmission (not shown). That is, the trunnions 204 each have a tilt shaft 222, about which they are rotated and along which they are moved. The tilt shaft 222 of the trunnion 204 is secured with a piston 214, which is slidably installed in a hydraulic cylinder 215 formed in the transmission casing. In the hydraulic cylinder 215 there are formed cylinder chambers 216, 217 separated by the piston 214.

The cylinder chambers 216, 217 of the hydraulic cylinder 215 communicate through passages 218, 219 to a spool valve 220. A spool 20 in the spool valve 220 is held at the neutral position by the balancing force between a spring 221 installed at an axial end of the valve and an oscillating lever 223 pressed against the other end of the valve. The spool valve 120 has a P port 227 connected to a pump pressure (pressure source), an A port 232 connected to the cylinder chamber 216 through the passage 218, a B port 231 connected to the cylinder chamber 217 through the passage 219, and T ports or drain ports 228 connected to a drain. Between the spool valve 220 and the spool 201 is movably fitted a sleeve 206 that has five ports communicating to the A port 232, B port 231, P port 227 and drain ports 228. These five through-holes or ports formed in the cylinder portion of the sleeve communicate with the A port 232, B port 231, P port 227 and drain ports 228 formed in the valve body 224 when the sleeve 206 is at the neutral position. The sleeve 206 is driven by an actuator 205 according to the control signal from the controller 207 to set the transmission ratio to a predetermined value. The sleeve 206 is reset by a return spring 225 to a predetermined transmission ratio on the speed-increase side.

The spool 201 of the spool valve 220 is moved in the sleeve 206 and selectively switched to one of three positions-a first position that connects one of the cylinder chambers 216 to the P port 227 and the other cylinder chamber 217 to the T ports or drain ports 228, a second position that connects the first cylinder chamber 216 to the drain ports 228 and the second cylinder chamber 217 to the P port 227, and a neutral position that disconnects the both cylinder chambers 216, 217 from the P port 227 and the drain ports 228. The switching control of the spool 201 is done by the actuator 205 according to the signal from the controller 207. The A port 232 of the passage 218 in the spool valve 220 is connected to the first cylinder chamber 216 through the passage 218. When an oil pressure is supplied from the A port 232 to the hydraulic cylinder 215, the pressure of the A port 232 is applied to the first cylinder chamber 216. The B port 231 of the spool valve 220 communicates with the other cylinder chamber 217 through the passage 219. When the oil pressure is supplied from the B port 231 to the hydraulic cylinder 215, the pressure of the B port 231 acts on the second cylinder chamber 217.

The front end of one of the tilt shafts 222 is connected to a precess cam 202, against which one end of an oscillation lever 223 pivotably supported at the center is pressed. The other end of the oscillation lever 223 is pressed against the spool 201. The oscillation lever 223 transmits the axial displacement and rotation angle of the tilt shaft 222 of the trunnions 204 in the form of a synthetic displacement to the spool 201. The speed change control is performed by utilizing the fact that when the trunnions 204 are moved toward either direction of the tilt shafts (in the axial direction of the tilt shafts 222) from the neutral position (the position where the rotation axes of the power rollers 203 cross the rotation axes of the input disk 212 and output disk 213), the trunnions 204 pivot about the tilt shafts 222 in the direction and at a speed that correspond to the direction and amount of the displacement, thereby changing the rotation speed. The toroidal continuous variable transmission also has a car speed sensor, an engine revolution sensor, and a throttle opening sensor. Transmission information signals such as car speed, engine revolution and throttle opening detected by these sensors are fed to the controller 207.

Next, the operation of the toroidal continuous variable transmission of the above construction is described. The spool 201 of the spool valve is connected through the precess cam 202 to the trunnion 204 that supports the power roller 203 and is held at a position corresponding to the synthesized displacement of the trunnion 204 representing the tilt angle and axial movement of the tilt shaft 222 combined. The actuator 205 controls the axial position of the sleeve 206 according to the signals from the controller 207. For example, when the sleeve 206 moves toward the right from the position of FIG. 8, i.e., toward the speed-decrease side, its position relative to the spool 201 changes, communicating the passage 219 to the P port 227 connected to the oil pressure source and the passage 218 to the T ports or drain ports 228. As s result, the oil pressure in the passage 219 becomes higher than the oil pressure in the passage 218, offsetting the trunnion 204 downward through the piston 214. At this time, the side slip force causes the power rollers 203 to tilt about the tilt shaft 222 in the direction of arrow DOWN. The sleeve 206 moved to the left in FIG. 8, i.e., toward the speed-increase side, is moved to the initial position by a force of the return spring 225.

As the power rollers 203 pivot, the spool 201 shifts toward right by an amount corresponding to the power rollers' combined displacement consisting of the displacement in the tilt shaft axial direction and the tilt angle, throttling the communication between the P port 227 and the passage 219 and between the drain ports 228 and the passage 218 until the relative position between the sleeve 206 and the spool 201 becomes neutral, at which time the pressures of the passage 218 and the passage 219 are equal. In this state, however, because the power rollers 203 stay offset in the axial direction of the tilt shaft 222, they continue pivoting by the side slip force, causing the spool 201 to move toward left from the neutral position with respect to the sleeve 206. As a result, the oil pressure in the passage 219 becomes lower than the oil pressure in the passage 218, and the trunnion 204 is moved upward through the piston 214, reducing the displacement in the tilt shaft axial direction of the power rollers 203 and therefore the slide slip force and the tilting speed. In the toroidal continuous variable transmission described above, the above sequence of operation is repeated. The speed change operation is ended when the displacement of the power rollers 203 in the tilt shaft axial direction is zero and the position of the spool 201 is neutral with respect to the sleeve 206.

In the toroidal continuous variable transmission of FIG. 8, however, when an electrical fault occurs resulting in a failure of the actuator 205, the position of the sleeve 206 cannot be controlled by the command signal from the controller 207. For this reason, because in the event of an electrical failure the sleeve 206 is either held at the position that it occupied when an electrical failure occurred, i.e., the transmission ratio is kept unchanged or is fixed at a position corresponding to a predetermined transmission ratio, the transmission ratio of the speed change unit is also fixed at a transmission ratio corresponding to the position of the sleeve 206. In the toroidal continuous variable transmission, therefore, to prevent a sudden engine braking from being applied in the event of an electrical failure when the car is running at high speed, the predetermined transmission ratio, at which the unit is supposed to be fixed, is set on the speed-increase side. When, however, the car stops with the transmission ratio left set on the speed-increase side, the car may be put in a dangerous situation where it lacks not only a driving power at the starting but also a braking force because of the high transmission ratio when it stops at a rising slope or when it is heavily loaded. In the worst case, the car may not be able to start at all.

SUMMARY OF THE INVENTION

A primary object of this invention is to provide a double cavity type toroidal continuous variable transmission with a self-synchronization function, which, when a difference produced in the transmission ratio between the two toroidal speed change units is smaller than a predetermined amount, allows the rotation difference between the two output disks thereby preventing seizure due to interlocking and slippage in the transmission equipment and, when the transmission ratio difference exceeds the predetermined amount, forcibly synchronizes the two units by the viscous clutch thus preventing the two units from remaining unequal in the transmission ratio.

Another object of this invention is to provide a toroidal continuous variable transmission, which, when the transmission ratio difference between the two toroidal speed change units is small, maintains the self-synchronization function and, when the difference becomes large, activates the differential mechanism to prevent seizure due to interlocking and slippage.

A further object of this invention is to provide a toroidal continuous variable transmission, in which, when the shift lever is set to a low-speed range, the toroidal speed change unit shifts the sleeve to a predetermined transmission ratio position on the speed-decrease side by applying a signal pressure from the manual valve that was shifted to the low-speed range; in which, when in this low-speed range an electrical system fails, the unit shifts the sleeve toward the speed-decrease side thereby enabling the car to start after it was stopped on an ascending slope or when it is heavily loaded; and in which, when the gearshift position is in other than the low-speed range, the unit either holds the sleeve at the transmission ratio position used when the failure occurred as in the conventional transmission or shifts it to a predetermined transmission ratio position on the speed-increase side, thereby preventing sudden application of engine brake and assuring safe driving.

This invention relates to a toroidal continuous variable transmission, which comprises: an input shaft; a pair of input disks that rotate with the input shaft; a pair of output disks disposed opposite the corresponding input disks and rotatably mounted on the input shaft; tiltable power rollers disposed between the opposing input disks and output disks to transfer torque from the input disks to the output disks; a viscous clutch provided on the output side of the output disks which can allow a rotation difference smaller than a predetermined amount between the output disks and which, when the rotation difference is greater than the predetermined amount, couples together the both output disks; and an output shaft connected to the viscous clutch.

In this toroidal continuous variable transmission, because the two output disks of the first toroidal speed change unit and the second toroidal speed change unit are drivably connected to the output shaft through the viscous clutch, the torque from the output disks is transmitted from the input-side disk of the viscous clutch to the output-side disk and out to the output shaft through the output gear.

Even when there is a difference in the transmission ratio which is smaller than a predetermined amount, between the first and second toroidal speed change units, the input portion of the viscous clutch, capable of allowing relative rotation between the engagement members, can absorb rotation difference between the output disks and transmit power, thus eliminating interlock of the transmission equipment and preventing excessively large inputs from being applied to the toroidal speed change unit, which in turn prevents slippage of the contact portions between the power rollers and the disks.

If the transmission ratio difference between the first and the second toroidal speed change units becomes large and when the rotation difference is greater than a predetermined amount, the viscous clutch locks the both output disks, forcibly synchronizing the two toroidal speed change units. This self-synchronization function prevents an unwanted situation where the torques are not transmitted rendering the car unable to run.

For example, when the first toroidal speed change unit is deviated toward the speed-increase side beyond the second toroidal speed change unit, the viscous clutch increases the load of the first toroidal speed change unit as in the conventional transmission equipment, shifting the first unit toward the speed-decrease side. Conversely, when the first toroidal speed change unit is deviated toward the speed-decrease side beyond the second toroidal speed change unit, the viscous clutch reduces the load of the second unit shifting it toward the speed-increase side. In this way, the first and second toroidal speed change units maintain the self-synchronization function.

The differential mechanism is installed between the two output disks. This mechanism is a bevel gear type differential mechanism, which comprises a pair of side gears drivably connected to the output disks, pinions meshed with the both side gears, a differential case rotatably supporting the pinions, and an output gear secured to the differential case and drivably connected to the output shaft. Alternatively, the differential mechanism may be a planetary gear type differential mechanism.

Because the two output disks are coupled through the differential mechanism, the difference in the transmission ratio between the two toroidal speed change units, if it occurs, can be absorbed by the differential mechanism of bevel gear type or planetary gear type, without reducing the overall efficiency of the equipment as a whole or producing heat at the traction contact portion. When a difference occurs in the power roller tilt angle between the two toroidal speed change units due to deformation of power roller supporting members, the transmission ratio difference between the units cannot be absorbed with the conventional toroidal continuous variable transmission. With the toroidal continuous variable transmission of this invention, however, this difference can be absorbed.

This toroidal continuous variable transmission obviates the need for strictly synchronizing the power rollers' tilt angles of the two toroidal speed change units, as is required with the conventional equipment, and offers the advantage of being able to simplify the speed change control of the two speed change units. With the conventional toroidal continuous variable transmission, it is necessary to apply a large pressing force at all times by the loading cam in order to prevent slippage between the power rollers and the input/output disks and thereby stabilize the operation. This results in the overall equipment size becoming large. With the toroidal continuous variable transmission of this invention, however, because no slippage or heat is produced at the traction contact portions, there is no need to apply a large pressing force, which in turn contributes to reducing the equipment size.

This invention relates to a toroidal continuous variable transmission, which comprises: an input shaft; a pair of input disks that rotate with the input shaft; a pair of output disks disposed opposite the corresponding input disks and rotatably mounted on the input shaft; tiltable power rollers disposed between the opposing input disks and output disks to transfer torque from the input disks to the output disks; a differential mechanism to drivably connect the output disks; a clutch to transmit and interrupt torque between the output disks; and an output shaft drivably connected to the differential mechanism.

The differential mechanism comprises a pair of side gears, pinions meshed with the both side gears, a differential case rotatably supporting the pinions, and an output gear secured to the differential case and drivably connected to the output shaft, and wherein the clutch transmits and interrupts torques between a pair of engagement members, with one engagement member connected to one of the side gears and to one of the output disks and with the other engagement member connected to the other side gear and the other output disk.

Alternately, the differential mechanism is a planetary gear mechanism, which comprises a sun gear connected to one of the output disks, pinions connected to the other output disk and meshed with the sun gear, a carrier supporting the pinions, and a ring gear meshed with the pinions and drivably connected to the output shaft, and wherein the clutch transmits and interrupts torques between a pair of engagement members, with one engagement member connected to the sun gear and with the other engagement member connected to the carrier.

When a planetary gear mechanism is adopted as the differential mechanism, it is preferred that a double pinion type planetary gear mechanism be used which comprises a first pinion in mesh with the sun gear and a second pinion in mesh with the ring gear and the first pinion.

The clutch may be a clutch, an electromagnetic clutch, a slip joint or a torque limiter, or any other type that allows relative rotation between the input and output shafts.

As mentioned above, because this toroidal continuous variable transmission couples the pair of output disks through the differential mechanism, the transmission equipment assumes the same state as that of the conventional transmission equipment shown in FIG. 6 when the clutch is engaged and, when it is disengaged, assumes the same state as that of the conventional equipment shown in FIG. 7. When the difference in transmission ratio between the two toroidal speed change units is small, the clutch is engaged. As a result, the two toroidal speed change units synchronize with each other until the transmission ratios of the two units are equal. When the transmission ratio difference between the units becomes large, the clutch is disengaged. Because the rotation difference between the paired output disks is absorbed by the differential mechanism, it is possible to prevent slippage at the traction contact portions in the toroidal speed change units.

In this toroidal continuous variable transmission, when a transmission ratio difference occurs between the two toroidal speed change units but is small, the self-synchronization function is activated to synchronize the transmission ratios of the two toroidal speed change units, limiting the reduction in the transmission efficiency of the transmission equipment as a whole. When the transmission ratio difference is large, it is absorbed by the differential mechanism, preventing the equipment from being interlocked or the traction contact portions from slipping or getting seized.

This invention relates to a toroidal continuous variable transmission, which comprises: oppositely arranged input disks and output disks; tiltable power rollers to transmit the rotation of the input disks to the output disks while continuously changing the rotation speed of the output disks according to a change in the tilt angle of the power rollers with respect to the both disks; trunnions rotatably supporting the power rollers and adapted to be displaced in the axial direction of a tilt shaft from the neutral position to tilt the power rollers about the tilt shaft; hydraulic cylinders having pistons to displace the trunnions in the axial direction of the tilt shaft and cylinder chambers formed on both sides of the pistons; spool valves having spools to regulate oil pressures to the hydraulic cylinders; sleeves installed axially shiftable in the spool valve to set the transmission ratio to a predetermined value; a controller to control the axial positions of the sleeves by actuators; and a manual valve device to change the setting positions of the sleeves in response to the gearshift range of a shift lever when the actuators are not working.

The manual valve device comprises a manual valve, which is switched between a position that applies to the sleeves a signal pressure to fix the sleeves to a predetermined transmission ratio on the speed-decrease side when the shift lever position is in a low-speed range and a position that makes zero the signal pressure applied to the sleeves when the shift lever is in other than the low-speed range. The sleeve is returned to the predetermined transmission ratio on the speed-increase side by the return spring.

The predetermined transmission ratio on the speed-decrease side, to which the sleeves are fixed when the actuators are not working and the shift lever is in the low-speed range, is set further toward the speed-increase side than the transmission ratio that is used when the actuators are working and the shift lever is in the low-speed range.

In this toroidal continuous variable transmission, when the actuator-when moves according to signals from the controller the sleeve that is installed axially shiftable between the spool valve body and the spool and urged at all times by spring force toward the neutral position to set the transmission ratio to a predetermined value-fails, the position of the sleeve can be changed by the manual valve device that is operated according to whether the shift lever is in the low-speed range or in other range. At this time, when the shift lever is in the low-speed range, the sleeve is fixed to a predetermined transmission ratio position on the speed-decrease side. When the shift lever is in other than the low-speed range, the sleeve is restored by the return spring to be either held at the transmission ratio position that was used at the time of failure or shifted to a predetermined ratio on the speed-increase side.

With this toroidal continuous variable transmission, therefore, even when the actuator fails due to an electrical fault, it is possible to shift the sleeve to the speed-decrease side according to the selection by the driver of the gearshift position, allowing the car to run safely even when it is heavily loaded or when traveling on a descending slope. Further, because the sleeve is either held at the transmission ratio that was set by the actuator or shifted to a predetermined transmission ratio on the speed-increase side, application of sudden engine braking is prevented.

If the shift lever is in the L range when an electrical failure occurs, or when a driver operates the shift lever and selects the L range, the signal pressure is applied to the stepped portion of the sleeve, fixing the sleeve to a transmission ratio on the speed-decrease side, allowing the car to start after the it was stopped on an ascending slope or when it is heavily loaded. When the shift lever is in other than the L range in the event of the failure, the sleeve is either held at the transmission ratio that was used when the failure occurred or shifted to a predetermined transmission ratio on the speed-increase side.

Hence, this toroidal continuous variable transmission prevents sudden engine braking from being applied when an electrical failure occurs while running at high speed. Further, when the car is heavily loaded, the transmission ratio at the time of electrical failure is fixed to a ratio on the low-speed side according to the selection by the driver of the shift lever position, thus allowing the car to run safety with the engine brake activated.

In this toroidal continuous variable transmission, as described above, during the normal operating condition with no electrical failure, the speed change units are shifted to a predetermined transmission ratio by only the actuators according to the controller signals. When the actuator is not working due to an electrical failure, the sleeve is controlled to one of two transmission ratios-one on the speed-decrease side or one on the speed-increase side-according to the selected position of the shift lever.

DETAILED DESCRIPTION OF THE EMBODIMENT

Figure 1:
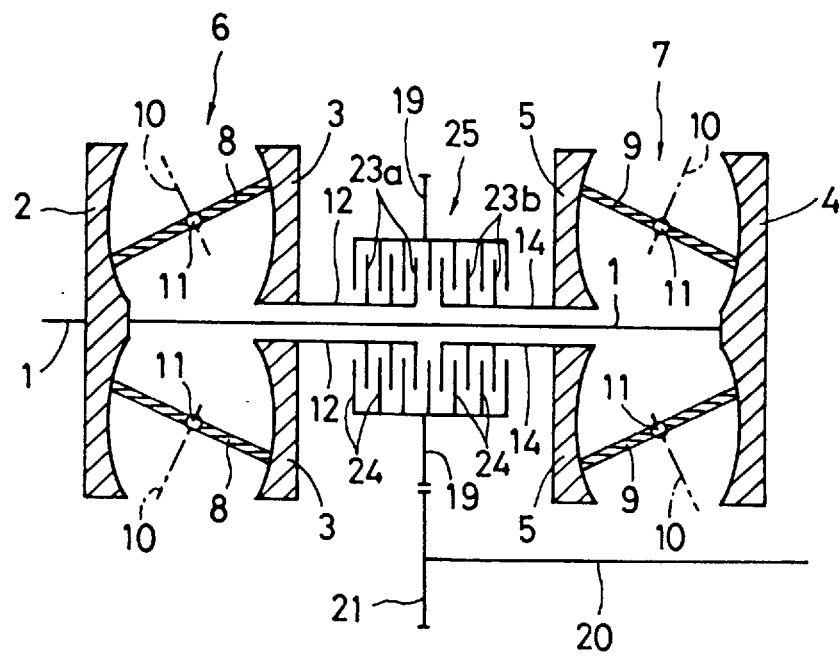
FIG. 1 is a schematic cross section showing the construction of the toroidal continuous variable transmission as one embodiment of this invention.

Now, a first embodiment of the toroidal continuous variable transmission according to this invention is described by referring to FIG. 1. As shown in the figure, the toroidal continuous variable transmission is of a double cavity type in which two toroidal speed change units 6 and 7 are mounted opposite each other on the same input shaft 1, with a viscous clutch 25 provided on the output side of the toroidal speed change units 6, 7.

The toroidal speed change unit 6 comprises an input disk 2, an output disk 3 disposed opposite the input disk 2, and power rollers 8 disposed between the input disk 2 and the output disk 3 and kept in frictional contact with the toroidal surfaces of the both disks. The toroidal speed change unit 7, like the toroidal speed change unit 6, includes an input disk 4, an output disk 5 and power rollers 9. The toroidal speed change units 6, 7 are provided with two power rollers each. The power rollers 8 and the power rollers 9 are rotatable on their own rotation axes 10 and tiltable about tilt axes 11 perpendicular to the rotation axes 10.

Figure 6:
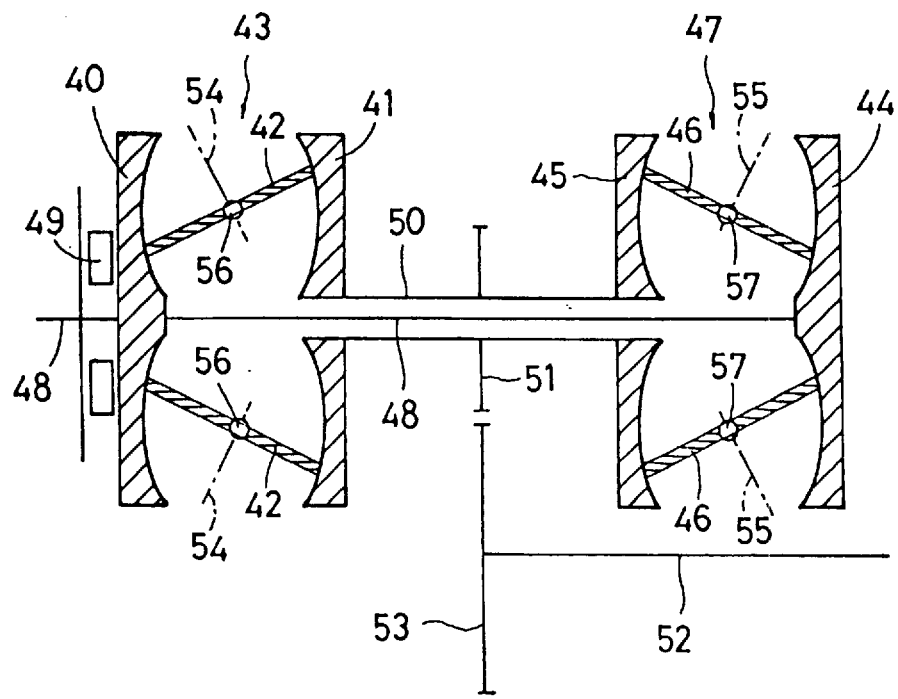
FIG. 6 is a schematic cross section showing the construction of one conventional toroidal continuous variable transmission.

The input shaft 1 is rotatably supported on the casing and receives torques from engine through a torque converter. The input disk 2, though rotatably mounted on the input shaft 1, can be coupled to the input shaft 1 through a loading cam (see reference number 49 in FIG. 6) so that it can rotate with the input shaft 1. The output disk 3 arranged opposite the input disk 2 is supported on the input shaft 1 so that it is rotatable relative to the input shaft 1. The input disk 4, also rotatably supported on the input shaft 1, can be coupled to the input shaft 1 through another loading cam so that it can rotate with it. The output disk 5 disposed opposite the input disk 4 is rotatably supported on the input shaft 1.

Between the output disks 3, 5 and an output shaft 20 is provided the viscous clutch 25, whose disks 23a, 23b on the input side are connected to hollow shafts 12, 14 on the output side of the output disks 3, 5 and whose disk 24 on the output side is connected to an output gear 19. The output gear 19 is in mesh with a gear 21 mounted on the output shaft 20. The viscous clutch 25 has a function of allowing for a rotation difference of less than a predetermined magnitude between the output disks 3, 5 and, for the rotation difference greater than the predetermined magnitude, fixing the output disks 3, 5.

Next, the operation of the first embodiment of the toroidal continuous variable transmission is explained. As the input shaft 1 receives torque from the engine, the torque is transmitted through the loading cam to the input disk 2. At the same time, the torque is also transmitted through another loading cam from the input shaft 1 to the input disk 4. When the torque is transferred to the input disk 2, the input disk 2 rotates turning the power rollers 8, which in turn causes the output disk 3 to rotate. The torque transmitted to the input disk 4 is further conveyed to the output disk 5 through the power rollers 9. While the torque is being transmitted, when the power rollers 8, 9 are synchronously tilted through the same angle about the tilt axes 11, the frictional engagement points between the power rollers 8, 9 and the input and output disks 3, 5 change, thus performing the continuous speed change operation.

The rotation of the output disk 3 is conveyed to the input-side disk 23a of the viscous clutch 25 and the rotation of the output disk 5 to the input-side disk 23b of the viscous clutch 25. When the transmission ratios of the toroidal speed change units 6, 7 are equal under normal running condition, or when the rotation difference between the output disks 3, 5 is below the predetermined value, the revolution speeds of the outputs disks 3, 5 are equal or have a difference within an allowable range, so that the viscous clutch 25 allows the relative rotation of these output disk while transmitting power. As a result, an output of the output disks 3, 5 balanced through the viscous clutch 25 is transmitted to the output shaft 20 through the output gear 19 and gear 21. This action prevents the transmission from being locked or a slip between the power rollers and the disks from occurring. When a difference greater than the predetermined magnitude occurs between the revolution speeds of the output disks 3, 5, the viscous clutch 25 couples the output disks 3, 5 causing them to rotate together, with the result that their output is conveyed to the output shaft 20 through the output gear 19 and gear 21. Hence, the toroidal speed change units 6, 7 are forcibly synchronized by the viscous clutch 25 causing the outputs of the output disks 3, 5 to be transferred through the output gear 19 and gear 21 to the output shaft 20.

Figure 2:
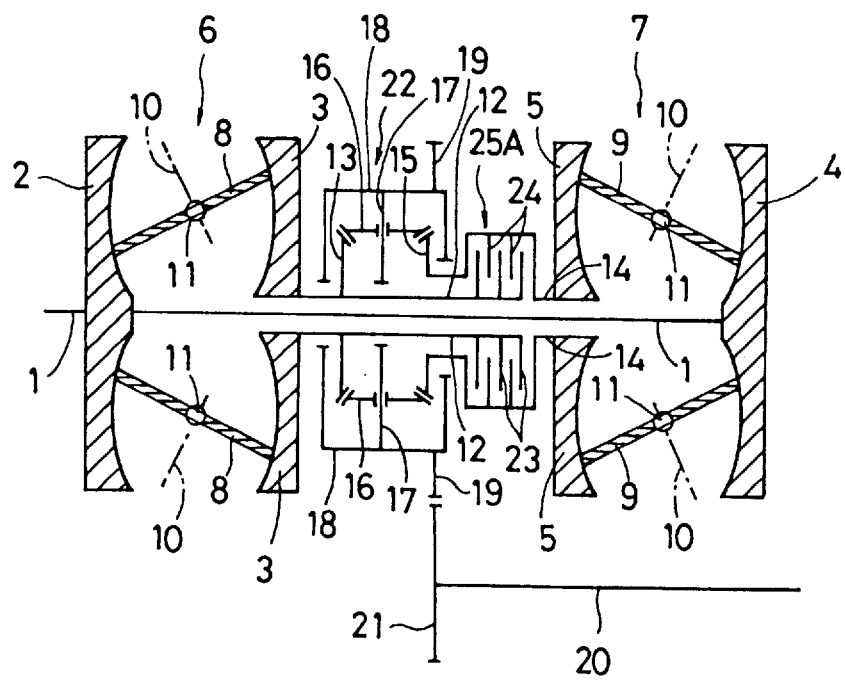
FIG. 2 is a schematic cross section showing the construction of the toroidal continuous variable transmission as another embodiment of this invention.

Next, by referring to FIG. 2, a second embodiment of the toroidal continuous variable transmission according to this invention is explained. The second embodiment has the same construction as the first embodiment, except that the second embodiment has a differential mechanism 22. So, components identical with those of the first embodiment are given like reference numerals and their explanations are not repeated.

This toroidal continuous variable transmission has a differential mechanism 22 installed between the output disks 3, 5 and the output shaft 20. The bevel gear type differential mechanism 22 comprises a side gear 13 connected to the output disk 3, a side gear 15 connected to the output disk 5 through a viscous clutch 25A, a pair of pinions 16 in mesh with the both side gears 13, 15, and an output gear 19 secured to a differential case 18 rotatably supporting the pinions 16 and also drivably connected to an output shaft 20. The output side of the output disk 3 is secured with one end of a hollow shaft 12 sleeved over the input shaft 1. The other end of the hollow shaft 12 is secured with the side gear 13 and with an inner disk 23 of the viscous clutch 25A. The output side of the output disk 5 is secured with one end of a hollow shaft 14 sleeved over the input shaft 1. The other end of the hollow shaft 14 is secured with an outer disk 24 of the viscous clutch 25A and with a side gear 15. The paired pinions 16 are disposed opposite each other with the input shaft 1 therebetween and are in mesh with both the side gears 13, 15. The pinions 16 are rotatably supported on pinion shafts 17 provided to the differential case 18, which is rotatably supported on the input shaft 1. The end surface of the differential case 18 is secured with the output gear 19. The output shaft 20 is arranged parallel to the input shaft 1, and a gear 21 secured to the output shaft 20 is meshed with the output gear 19.

Next, the operation of the toroidal continuous variable transmission shown in FIG. 2 is explained. As the input shaft 1 receives torque from the engine, the torque is transferred through the loading cam to the input disk 2. similarly, the torque is also transferred through the loading cam from the input shaft 1 to the input disk 4. When the torque is transferred to the input disk 2, the input disk 2 rotates, turning the power rollers 8, whose rotation is transmitted to the output disk 3. The torque transferred to the input disk 4 is conveyed to the output disk 5 through the power rollers 9. While the torque is transmitted, the synchronous tilting of the power rollers 8, 9 through the same angle about the tilt axes 11 causes the frictional engagement points between the power rollers 8, 9 and the input disks 2, 4 and output disks 3, 5 to change, thus performing the continuous speed change operation.

The rotation of the output disk 3 is transmitted to the side gear 13 and the rotation of the output disk 5 to the side gear 15. When under the normal running state the transmission ratios of the toroidal speed change units 6, 7 are equal, the revolution speeds of the output disks 3, 5 are equal and the both side gears 13, 15 rotate at the same revolution speeds. Hence, the pinions 16 do not rotate on their axes but revolve around the input shaft 1. The revolution of the pinions 16 causes the differential case 18 and therefore the output gear 19 secured to the differential case 18 to rotate with the pinions 16. The rotation of the output gear 19 is transferred to the output shaft 20 through the gear 21 meshed with the output gear 19.

When the transmission ratios of the toroidal speed change units 6, 7 become unequal due to, for instance, distortion of the input shaft 1 or deformation of the supporting members for the power rollers, a difference occurs between the rotation speeds of the output disks 3, 5. When, for example, the revolution speed of the output disk 3 becomes higher than that of the output disk 5, the side gear 13 connected to the output disk 3 rotates faster than the side gear 15 connected to the output disk 5. As a result, the pinions 16 spin on their own axes to absorb the rotation difference between the side gears 13, 15 while at the same time revolving around the input shaft 1. Therefore, because of the action of the differential mechanism 22 provided between the output disks 3, 5, even when the transmission ratios of the toroidal speed change units 6, 7 do not agree, no slip occurs at the traction contact portions in the toroidal speed change units 6, 7.

Next, a third embodiment of the toroidal continuous variable transmission according to this invention is explained. This embodiment, though not shown, has the similar construction and function to the second embodiment with the differential mechanism 22, except for the construction of the differential mechanism. The third embodiment employs a double-pinion planetary gear type differential mechanism as the differential mechanism 22. In this embodiment, the differential mechanism includes a sun gear connected to the output disk 3, a carrier that supports pinions drivably connected to the output disk 5 and meshed with the sun gear, and a ring gear meshed with the pinions and connected to the output shaft 20. The ring gear is secured with the output gear 19, which is in mesh with the gear 21 of the output shaft 20. The operation of the third embodiment is similar to that of the second embodiment.

Figure 3:
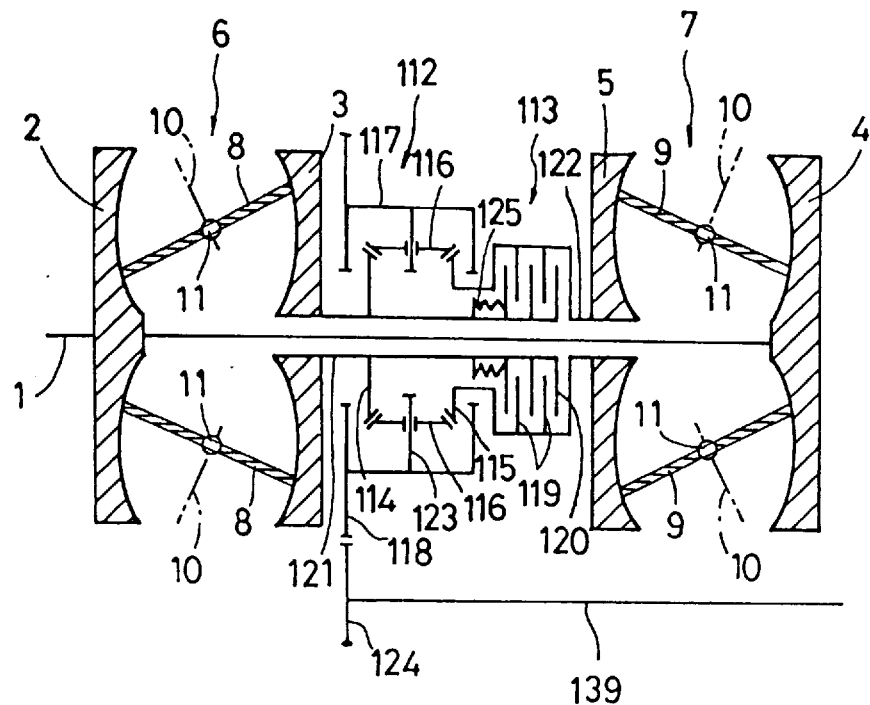
FIG. 3 is a schematic cross section showing the construction of the toroidal continuous variable transmission as a further embodiment of this invention.

Next, by referring to FIG. 3, a fourth embodiment of the toroidal continuous variable transmission is explained. In the figure, this toroidal continuous variable transmission is of a double cavity type in which two toroidal speed change units 6, 7 are mounted opposite each other on the same axis. The toroidal speed change units 6, 7 have the similar constructions to those of the preceding embodiments. So, the identical members are given like reference numerals and their explanations are not repeated.

In the fourth embodiment, there are provided a differential mechanism 112 and a clutch 113 between the output disks 3, 5 and an output shaft 139. The differential mechanism 112 is formed as a bevel gear type differential mechanism 112, which comprises a pair of side gears 114, 115, a pair of pinions 116 in mesh with the both side gears 114, 115, a differential case 117 rotatably supporting the pinions 116, and an output gear 118 secured to the differential case 117 and connected to the output shaft 139. The clutch 113 is a multiple disc friction clutch, which couples or decouples a pair of engagement members, i.e., friction members 119, 120 equipped with a number of friction discs, for transfer or interruption of torque. The friction member 119 is connected to the output disk 5 and the side gear 115, and the friction member 120 is connected to the output disk 3 and the side gear 114.

The back of the output disk 3 is secured with one end of a hollow shaft 121 sleeved over the input shaft 1. The intermediate portion of the hollow shaft 121 is rigidly fitted with the side gear 114 and the other end of the hollow shaft 121 is rigidly connected with the friction member 120 of the clutch 113. The back of the output disk 5 is secured with one end of a hollow shaft 122 sleeved over the input shaft 1. The other end of the hollow shaft 122 is connected with one end of the friction member 119 of the clutch 113, the other end of which is rigidly connected with the side gear 115. The pair of pinions 116 are arranged opposite each other with the input shaft 1 therebetween and are in mesh with the both side gears 114, 115. The pinions 116 are also rotatably supported on pinion shafts 123 provided to the differential case 117, which in turn in rotatably supported on the input shaft 1. The end surface of the differential case 117 is rigidly fitted with the output gear 118. The output shaft 139 is arranged parallel to the input shaft 1, and the gear 124 fixed on the output shaft 139 is in mesh with the output gear 118.

The clutch 113 is of a type that imparts the coupling force to the pair of friction members 119, 120 by a spring 125. The clutch 113 maintains a predetermined torque transmission capacity by the setting load of the spring 125 and the friction coefficient of the friction surface of the friction members 119, 120. When the difference between the transmission ratios of the two toroidal speed change units 6, 7 is small, the differential operation, as in the conventional equipment, is not allowed by the coupling force of the clutch 113, causing the units to self-synchronize with each other. When on the other hand the transmission ratio difference is large, i.e., when the torque received by the clutch 113 exceeds the torque transmission capacity of the clutch, the differential operation is allowed as when a viscous clutch is used but the differential limit force is constant because it depends on the torque transmission capacity of the clutch 113.

Next, the operation of the fourth embodiment of the toroidal continuous variable transmission is described. When the input shaft 1 receives torque from the engine, the torque is transmitted through the loading cam to the input disk 2. At the same time, the torque is also transferred through the loading cam from the input shaft 1 to the input disk 4. When the torque is transmitted to the input disk 2, the input disk 2 rotates, turning the power rollers 8, whose rotation is transmitted to the output disk 3. The torque transferred to the input disk 4 is conveyed to the output disk 5 through the power rollers 9. While the torque is transmitted, the synchronous tilting of the power rollers 8, 9 through the same angle about the tilt axes 11 causes the frictional engagement points between the power rollers 8, 9 and the input disks 2, 4 and output disks 3, 5 to change, thus executing the continuous speed change operation.

The clutch 113 has the friction members 119, 120 tightly coupled together by the force of the spring 125. These friction members remain coupled until a torque greater than the torque transmission capacity of the clutch 113 is received. In this state, when the pair of output disks 3, 5 are rotating at the same speed, i.e., the transmission ratios of the two toroidal speed change units 6, 7 are equal, the side gear 115 drivably connected to the output disk 5 and the side gear 114 connected to the output disk 3 rotate at the same speed. Hence, the pinions 116 meshed with the side gears 114, 115 revolve around the input shaft 1 without rotating on their own axes.

Figure 7:
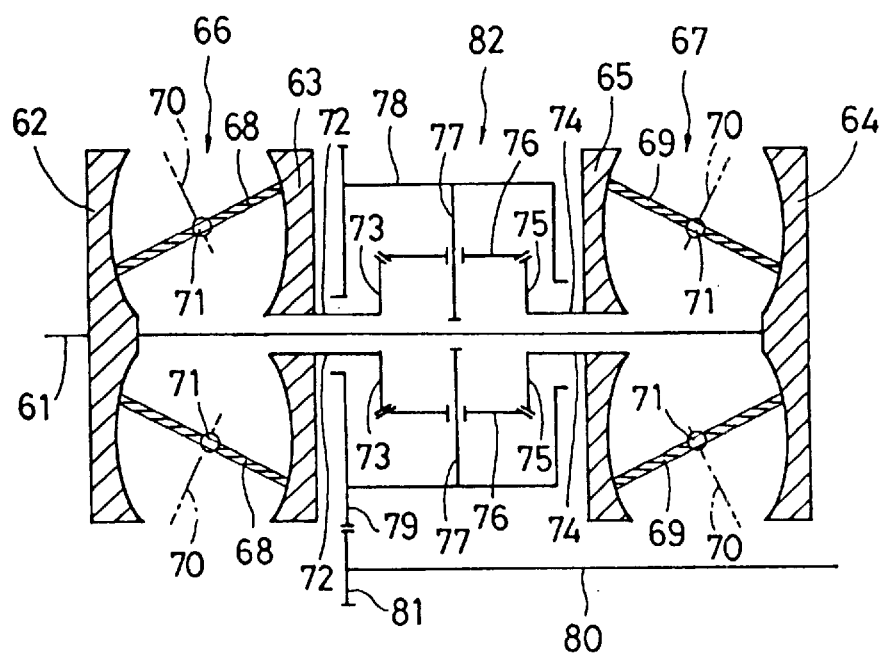
FIG. 7 is a schematic cross section showing the construction of another conventional toroidal continuous variable transmission.

Let us consider a case where a difference occurs between the transmission ratios of the two toroidal speed change units 6, 7. When the transmission ratio difference is small, the clutch 113 is strongly engaged by the force of the spring 125, so that the differentiation between the output disks 3, 5 is prohibited, resulting in the same self-synchronization as performed in the conventional equipment of FIG. 7. In this case, there is no slip in the clutch nor any reduction in the transmission efficiency of the toroidal continuous variable transmission.

When the transmission ratio difference between the two toroidal speed change units 6, 7 increases, the differential torque becomes large. When the differential torque exceeds the torque transmission capacity of the clutch 113, the clutch 113 starts slipping. For example, when the revolution speed of the output disk 3 becomes higher than that of the output disk 5, the side gear 114 rotates faster than the side gear 115. As a result, the pinions 116 meshed with the both side gears 114, 115 rotate on their own axes to absorb the revolution speed difference between the side gears 114, 115 while at the same time revolving around the input shaft 1. Hence, the transmission is prevented from being locked and no slip occurs at the contact points between the power rollers 8, 9 and the input disks 2, 4 and output disks 3, 5 in the toroidal speed change units 6, 7.

Figure 4:
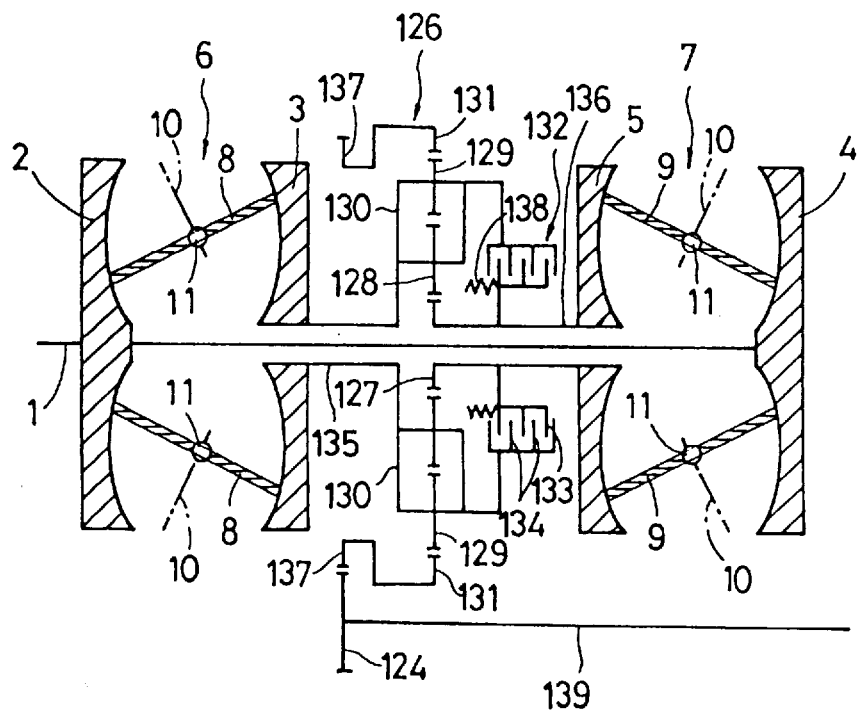
FIG. 4 is a schematic cross section showing the construction of the toroidal continuous variable transmission as a further embodiment of this invention.

Next, by referring to FIG. 4 a fifth embodiment of the toroidal continuous variable transmission according to this invention is explained. A differential mechanism 126 is formed of a planetary gear mechanism, which includes a sun gear 127 connected to the output disk 5, a carrier 130 that supports pinions 128 connected to the output disk 3 and meshed with the sun gear 127 and pinions 129 in mesh with the pinions 128, and a ring gear 131 in mesh with the pinions 129 and drivably connected to the output shaft 139. A clutch 132 is a multiple disc type friction clutch, which couples or decouples a pair of engagement members—a friction member 133 and a friction member 134—for transfer or interruption of torque. The friction member 133 is connected with the output disk 5 and the friction member 134 with the carrier 130.

The back of the output disk 3 is securely fitted with one end of a hollow shaft 135 sleeved over the input shaft 1. The other end of the hollow shaft 135 is rigidly connected with the carrier 130. The back of the output disk 5 is securely fitted with one end of a hollow shaft 136 sleeved over the input shaft 1. The other end of the hollow shaft 136 is securely connected with the sun gear 127. The central portion of the hollow shaft 136 is connected with the friction member 133 of the clutch 132. The ring gear 131 is rigidly fitted with an output gear 137, which is meshed with a gear 124 fixed to one end of the output shaft 139 arranged parallel to the input shaft 1.

Next, the operation of the fifth embodiment is explained. The rotation of the output disk 3 is transferred to the carrier 130. The rotation of the output disk 5 is transferred to the sun gear 127. In the normal state, i.e., when the transmission ratios of the two toroidal speed change units 6, 7 are equal, the revolution speeds of the outputs disk 3 and the output disk 5 are the same, so that the pinions 128, 129 do not rotate on their axes, causing the sun gear 127, pinions 128, 129, carrier 130, ring gear 131 and output gear 137 to revolve around the input shaft 1 as one piece. The rotation of the output gear 137 is transferred to the output shaft 139 through the gear 124 meshed with the output gear 137.

When there is a difference between the transmission ratios of the two toroidal speed change units 6, 7 due, for instance, to distortion of the input shaft 1 and deformation of the supporting members of the power rollers 8, 9, the output disks 3, 5 tend to rotate at different speeds. When the transmission ratio difference is small, the differential torque is also small, so that the clutch 132 remains tightly engaged causing the carrier 130 connected to the output disk 3 and the sun gear 127 connected to the output disk 5 to rotate together. In this way, when the transmission ratio difference, if it occurs, between the two toroidal speed change units 6, 7 is small, there is no difference in the revolution speed between the output disks 3, 5, so that the units self-synchronize with each other to make the transmission ratios equal.

When the transmission ratio difference increases, the differential torque exceeds the torque transmission capacity of the clutch 132, causing the clutch 132 to slip, producing a difference in the revolution speed between the output disks 3, 5. When, for example, the revolution speed of the output disk 5 is higher than that of the output disk 3, the sun gear 127 connected to the output disk 5 rotates faster than the carrier 130 connected to the output disk 3. As a result, the pinions 128 rotate on their axes causing the meshing pinions 129 to rotate on their axes to absorb the rotation difference between the output disks 3, 5. Hence, even when the transmission ratios of the toroidal speed change units 6, 7 do not match, the differential mechanism 126 provided between the output disks prevents the traction contact portions in the toroidal speed change units 6, 7 from slipping.

In the fifth embodiment, the engagement force of the clutch 132 is preset to a predetermined value by a spring 138 so that the differential operation is only allowed when the differential torque supplied to the toroidal continuous variable transmission exceeds the predetermined value. The clutch may be controlled so as to increase the engagement force when the transmission ratio difference is small and, when it becomes large, weaken the engagement force. In that case, a variety of control methods may be employed. One such control may involve electrically detecting the transmission ratios of the two toroidal speed change units, calculating their difference by a controller, and controlling the engagement force as by the hydraulic or electromagnetic force according to the calculated difference.

Figure 5:
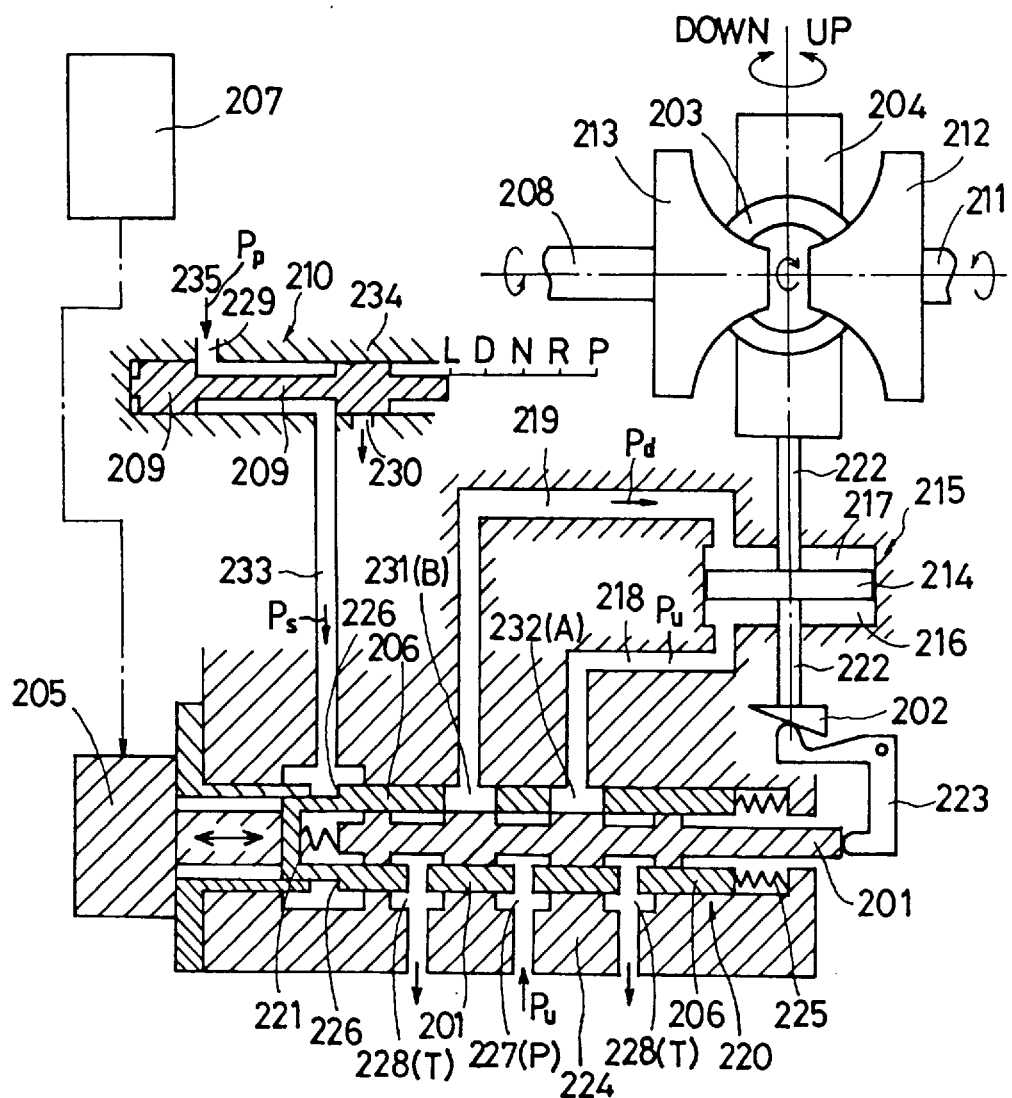
FIG. 5 is a schematic cross section showing the construction of the toroidal continuous variable transmission as a further embodiment of this invention.
Figure 8:
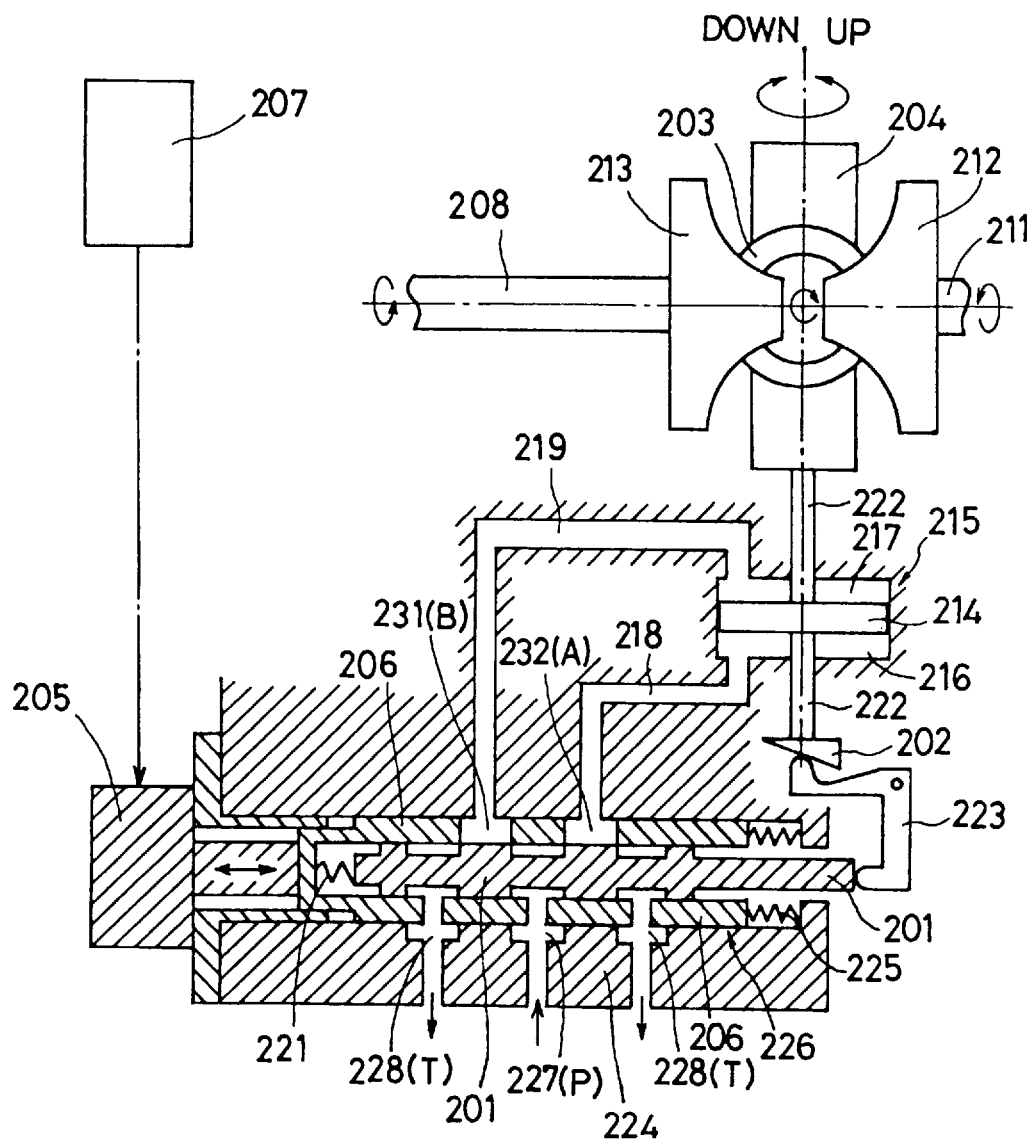
FIG. 8 is a schematic cross section showing the construction of further conventional toroidal continuous variable transmission.

Next, by referring to FIG. 5 a sixth embodiment of the toroidal continuous variable transmission according to this invention is described. The toroidal continuous variable transmission of the sixth embodiment relates to a hydraulic control in the toroidal speed change units 6, 7 used in the receding embodiments and is almost similar in construction to the conventional transmission shown in FIG. 8, except that this embodiment has a manual valve device to activate the sleeve. Components identical with those of the transmission of FIG. 8 are given like reference numbers.

An input disk 212 and an output disk 213 are arranged opposite each other and power rollers 203 are disposed between the input and output disks 212, 213. The power rollers 203 rotate in contact with the both disks and can be tilted. According to the tilt angle, the power rollers 203 continuously change the rotation speed of the input disk 212 in transmitting the rotation to the output disk 213. The power rollers 203 are each rotatably supported on the trunnions 204 through eccentric shafts. Hydraulic cylinders 215 are installed below the power rollers 203. The hydraulic cylinder 215 has two cylinder chambers 216, 217 separated by a piston 214 integrally secured to a tilt shaft 222 of the trunnion 204. When oil pressure is supplied through a spool valve 220 to one of the cylinder chambers 216, 217, the trunnion 204 moves in the axial direction of the tilt shaft 222 from the neutral position. As the trunnions 204 are displaced in the axial direction of the tilt shaft 222, the power rollers 203 pivot about the tilt shafts 222. That is, because the power rollers 203 are rotatably supported on the trunnions 204 through the eccentric shafts, when the trunnions 204 move in the axial direction of the tilt shaft 222 from the neutral position, the power rollers 203 are acted upon by a force in the direction of the velocity vector from the input disk 212 and the output disk 213 and pivot or tilt about the tilt shaft 222 according to the amount of the axial displacement of the trunnions 204.

The cylinder chambers 216, 217 of the hydraulic cylinders 215 communicate to the spool valve 220 through the passages 218, 219. The spool valve 220 has a P port 227 connected to an oil pressure source, i.e., pump pressure P, an A port 232 connected to the cylinder chamber 216 through the passage 218, a B port 231 connected to the cylinder chamber 217 through the passage 219, and T ports 228 connected to a drain. The spool valve 220 comprises a case 224 constituting a valve body, a spool 201 slidably installed in the case 224, and a cylindrical sleeve 206 slidably fitted between the case 224 and the spool 201. A return spring 225 is installed at one end of the sleeve 206 so that the sleeve 206 is returned to the initial position, set by the actuator 205, of the predetermined transmission ratio by a force of the return spring 225.

The toroidal continuous variable transmission of the sixth embodiment includes a sleeve 206 installed axially slidable in the spool valve 220 to set the transmission ratio to a predetermined value; a controller 207 to control the axial position of the sleeve 206 by the actuator 205; and a manual valve device 210 to change the setting position of the sleeve 206 in response to the gearshift position of the shift lever when the actuator 205 does not work. The sleeve 206 is installed axially shiftable between the valve case 224 and the spool 201 and is always urged toward the neutral position by the force of the return spring 225. Here, the sleeve 206 is set to return to a predetermined transmission ratio on the speed-increase side by the return spring 225. The manual valve device 210 comprises a manual valve 209, which can be slidably moved between a low-speed shift position—the position that applies a signal pressure Pp to one end of the sleeve 206 to keep it at the predetermined position—and a shift position other than the low-speed shift position that sets the signal pressure applied to the sleeve 206 to zero.

The sleeve 206 has a stepped portion 226 formed at one end thereof, to which the signal pressure is applied from the manual valve device 210 through the passage 233. The manual valve device 210 has a manual valve 209 that is slid inside the case 234 to a position that connects the port 229 communicating with the oil pressure source to the passage 233 and to a position that connects the passage 233 to the drain port 230. The manual valve 209 is slid inside the case 234 in response to the gearshift range selected by the shift lever. FIG. 5 shows five gearshift ranges—a low-speed L, an automatic drive D, a neutral N, a reverse R, and a parking P. The L range is a speed-change range including first- or second-speed where the engine brake can be applied.

When under normal condition there is no electrical failure in the speed change unit, the manual valve 209 that moves in the case 234 of the manual valve device 210 is situated at the low-speed L range, causing the pressure source 235 to communicate through the port 229 and manual valve 209 to the passage 233, thereby applying the pressure Pp as a signal pressure Ps to the stepped portion 226 of the sleeve 206. Under the normal condition, the transmission ratio in the L range sets the sleeve 206 further toward the speed-decrease side, so that the sleeve 206 is pushed by the actuator 205 toward the speed-decrease side further than it is pushed by the pressure Pp of the signal pressure Ps. Hence, there is no adverse effect of the manual valve 209 on the control during the normal condition.

Further, when there is no electrical failure with the speed change unit, if the manual valve 209 is positioned at other than the low-speed range L, i.e., at the D, N, R or P range, the pressure 233 communicates with the drain port 230 through the manual valve 209, causing the signal pressure Ps in the passage 233 to become zero. Then, in response to the signal from the controller 207, the actuator 205 pushes the sleeve 206 toward the right in FIG. 5 in the spool axis direction against the force of the return spring 225, setting the transmission ratio to a predetermined value. That is, the force of the return spring 225 is used for pushing the sleeve 206 to the left in FIG. 5 toward the speed-increase side. At this time, when the shift lever is at other than the L range, the pressure 233 is drained, with the result that no signal pressure Ps is applied to the stepped portion 226 of the sleeve 206, which is therefore is controlled only by the actuator 205.

In the event that an electrical fault occurs with the speed change unit while the car is running, the signal from the controller 207 is lost, inactivating the actuator 205, so that the transmission ratio is either held at the transmission ratio that was set by the actuator 205 at time of failure or shifted to the predetermined transmission ratio on the speed-increase side. That is, if the shift lever is set in the low-speed range L when the electrical failure occurred with the speed change unit, the pressure Pp as the signal pressure Ps is applied to the stepped portion 226 of the sleeve 206 through the manual valve 209, holding the sleeve 206 at a position where the signal pressure Pp and the force of the return spring 225 balance, i.e., at a position corresponding to the predetermined transmission ratio of the speed-decrease side. The low-speed side transmission ratio in this case is set further toward the speed-increase side than the transmission ratio of the low-speed range that is set when the actuator 205 is working. If the shift lever is at other than the low-speed L range, i.e., D, N, R or P range, the signal pressure Ps applied to the stepped portion 226 of the sleeve 206 through the manual valve 209 becomes zero, allowing the sleeve 206 to be returned by the force of the return spring 225 to the transmission ratio position set by the actuator 205, either holding the transmission ratio that was used at time of electrical failure or changing the transmission ratio to the predetermined ratio on the speed-increase side.

When, in the event of an electrical failure, a driver wishes to apply an engine brake while running, the gearshifting to the L range causes the pressure source 235 to communicate to the passage 233 through the port 229 and manual valve 209, applying the pressure Pp as the signal pressure Ps to the stepped portion 226 of the sleeve 206, which is then moved to a position where the pressure Pp and the force of the return spring 225 balance, fixing the transmission ratio to a predetermined value on the speed-decrease side (on the right side). At this time, the fixed transmission ratio is set to a ratio that is further toward the speed-increase side than the transmission ratio that is used during the normal operating condition (under which no electrical failure occurs and the sleeve is controlled by the actuator 205 according to the signal from the controller 207). When an electric system fails with the shift lever in the L range, the sleeve 206 receives at its stepped portion 226 the signal pressure and is shifted toward the speed-decrease side (to the right) to a position where the pressure and the force of the return spring 225 balance, thus fixing the transmission ratio to a predetermined value on the speed-decrease side.

What is claimed is:

1. A toroidal continuous variable transmission comprising:

an input shaft;

a pair of input disks that rotate with the input shaft;

a pair of output disks disposed opposite the corresponding input disks and rotatably mounted on the input shaft;

tiltable power rollers disposed between the opposing input disks and output disks to transfer torque from the input disks to the output disks;

a viscous clutch provided on the output side of the output disks which can allow a rotation difference smaller than a predetermined amount between the output disks and which, when the rotation difference is greater than the predetermined amount, couples together the both output disks; and an output shaft connected to the viscous clutch.

2. A toroidal continuous variable transmission according to claim 1, wherein a differential mechanism is installed between any one of the output disks and the viscous clutch.

3. A toroidal continuous variable transmission according to claim 2, wherein the differential mechanism is a bevel gear type differential mechanism, which comprises a first side gear connected to the corresponding one of the output disks, a second side gear connected to the viscous clutch, pinions meshed with the first side gear and the second side gear, a differential case rotatably supporting the pinions, and a first output sear secured to the differential case, the first output gear meshed with a second output gear connected to the output shaft.

4. A toroidal continuous variable transmission according to claim 2, wherein the differential mechanism is a planetary gear type differential mechanism.

5. A toroidal continuous variable transmission comprising:

an input shaft;

a pair of input disks that rotate with the input shaft;

a pair of output disks disposed opposite the corresponding input disks and rotatably mounted on the input shaft;

tiltable power rollers disposed between the opposing input disks and output disks to transfer torque from the input disks to the output disks;

a different mechanism to drivably connect the output disks;

a clutch to transmit and interrupt torque between the output disks; and an output shaft drivably connected to the differential mechanism.

6. A toroidal continuous variable transmission according to claim 5, wherein the differential mechanism comprises a pair of side gears, pinions meshed with the both side gears, a differential case rotatably supporting the pinions, and an output gear secured to the differential case and drivably connected to the output shaft, and wherein the clutch transmits and interrupts torques between a pair of engagement members, with one engagement member connected to one of the side gears and to one of the output disks and with the other engagement member connected to the other side gear and the other output disk.

7. A toroidal continuous variable transmission according to claim 5, wherein the differential mechanism is a planetary gear mechanism, which comprises a sun gear connected to one of the output disks, pinions connected to the other output disk and meshed with the sun gear, a carrier supporting the pinions, and a ring gear meshed with the pinions and drivably connected to the output shaft, and wherein the clutch transmits and interrupts torques between a pair of engagement members, with one engagement member connected to the sun gear and with the other engagement member connected to the carrier.

* * * * *